(12) United States Patent
Montes De Oca et al.

(10) Patent No.: US 7,882,228 B2
(45) Date of Patent: Feb. 1, 2011

(54) INTEGRATED APPLICATION ACCESS

(75) Inventors: Marcial Montes De Oca, Marlborough, MA (US); Chi-Hwei Julie Lin, Somerville, MA (US); Manuel Ledesma, Waltham, MA (US); Yunyan Wang, Framingham, MA (US); Fang Xie, Burlington, MA (US); Tsehsin Jason Liu, Wellesley, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 589 days.

(21) Appl. No.: 11/584,111

(22) Filed: Oct. 20, 2006

(65) Prior Publication Data
US 2008/0098111 A1    Apr. 24, 2008

(51) Int. Cl.
 *G06F 15/173* (2006.01)
(52) U.S. Cl. .................. 709/225; 709/201; 709/217; 709/232; 707/1; 707/8; 707/10; 705/28
(58) Field of Classification Search ............ 709/201, 709/202, 204, 218, 219; 707/1, 8, 10; 705/28
 See application file for complete search history.

(56) References Cited

U.S. PATENT DOCUMENTS

| | | | |
|---|---|---|---|
| 6,591,300 B1 * | 7/2003 | Yurkovic | 709/226 |
| 6,918,088 B2 * | 7/2005 | Clark et al. | 715/742 |
| 7,143,136 B1 * | 11/2006 | Drenan et al. | 709/204 |
| 7,788,388 B2 * | 8/2010 | Piersol | 709/229 |
| 2003/0088617 A1 * | 5/2003 | Clark et al. | 709/203 |
| 2003/0149722 A1 * | 8/2003 | Jolley et al. | 709/203 |
| 2004/0128347 A1 * | 7/2004 | Mason et al. | 709/203 |
| 2004/0230807 A1 * | 11/2004 | Baird et al. | 713/182 |
| 2005/0246292 A1 * | 11/2005 | Sarcanin | 705/67 |
| 2006/0015416 A1 * | 1/2006 | Hoffman et al. | 705/28 |
| 2006/0031681 A1 * | 2/2006 | Smith et al. | 713/182 |
| 2006/0206922 A1 * | 9/2006 | Johnson et al. | 726/4 |
| 2007/0214421 A1 * | 9/2007 | Jolley et al. | 715/742 |

\* cited by examiner

*Primary Examiner*—Wing F Chan
*Assistant Examiner*—Razu A Miah (57) ABSTRACT

An exemplary system includes an application portal providing access to items of a plurality of remote applications, wherein at least one of the items is related to more than one of the remote applications, and an authorization layer that is included in the portal and that includes a permission map indicating an association between a user and at least one of the items of the plurality of remote applications that the user is permitted to access. In certain embodiments, the items include an application program interface (API). In certain embodiments, the authorization layer is synchronized with the remote applications, whereby the permission map is updated concerning information about at least one of the items that the user is permitted to access. Corresponding methods and systems are also disclosed.

21 Claims, 6 Drawing Sheets

INTEGRATED APPLICATION ACCESS

BACKGROUND INFORMATION

A typical enterprise computing environment includes multiple heterogeneous and distributed applications for accessing a variety of different systems covering different subject areas. For example, many enterprises such as businesses and the like have different systems to support customer billing, sales, accounting, inventory, ordering, procurement, technical support, field repairs, etc. Such different systems each generally have a dedicated application, e.g., a web application or a client server application, for accessing each of the different systems in an enterprise. Applications allowing users to access different systems are often incompatible with one another for a variety of reasons, particularly when, to begin with, such applications are not even part of the same enterprise.

In one common scenario, where an enterprise is the result of a merger or acquisition, the enterprise may have multiple unrelated systems for performing a single function. For example, the two companies joined by a merger may each have had their own systems for tracking repairs prior to the merger, and after the merger it may be impractical or difficult to combine the two systems. To take another example, an enterprise may have one system for provisioning or fulfilling new orders and another system for tracking repair requests, the two systems having been developed independently. However, it may often be the case that the same user, e.g., a customer, wishes to access multiple systems within an enterprise because multiple systems include data of interest to the user. Indeed, a customer's account information may be spread across multiple systems within the enterprise, e.g., repair, billing, provisioning, etc.

It is common for enterprises to have what is known as a portal, e.g., a web site, that is a single point of access, through which users both within and without the enterprise can access diverse applications and systems. Often, portals provide web pages with links to different applications. When a user selects such a link, the user is invited to log in to the selected application. In some cases, using a technique known as "account aggregation," the user may be permitted to provide to the portal login information for various applications. The portal then stores the user's login information for each of the various applications, and maps this login information to the user's login information for the portal.

However, to provide login information to the portal concerning each of the various enterprise applications that the user may need to access, means first that the user have a login account for each enterprise application that the user will access, and second that the user is aware of the enterprise application that the user needs to access. In many cases, users will not have the time or knowledge to provide such information to a portal. Further, an enterprise may have multiple portals, e.g., due to a merger or the like as discussed above, but such multiple portals may be un-integrated and therefore data concerning user entitlements to various application features and functions included in one portal may not be included in a second portal.

In sum, because present portals are able to allow users to view certain sets of data only according to application-specific login information limited to the portal, present portals make it difficult, if not impossible, for users to access data of interest to them. In general, present portals do not allow users to quickly and efficiently access the data that they wish to see, and do not create an interface to various systems within an enterprise that renders transparent to the user of the fact that all of these different systems exist.

DETAILED DESCRIPTION OF THE PREFERRED EMBODIMENTS

Figure 1A:
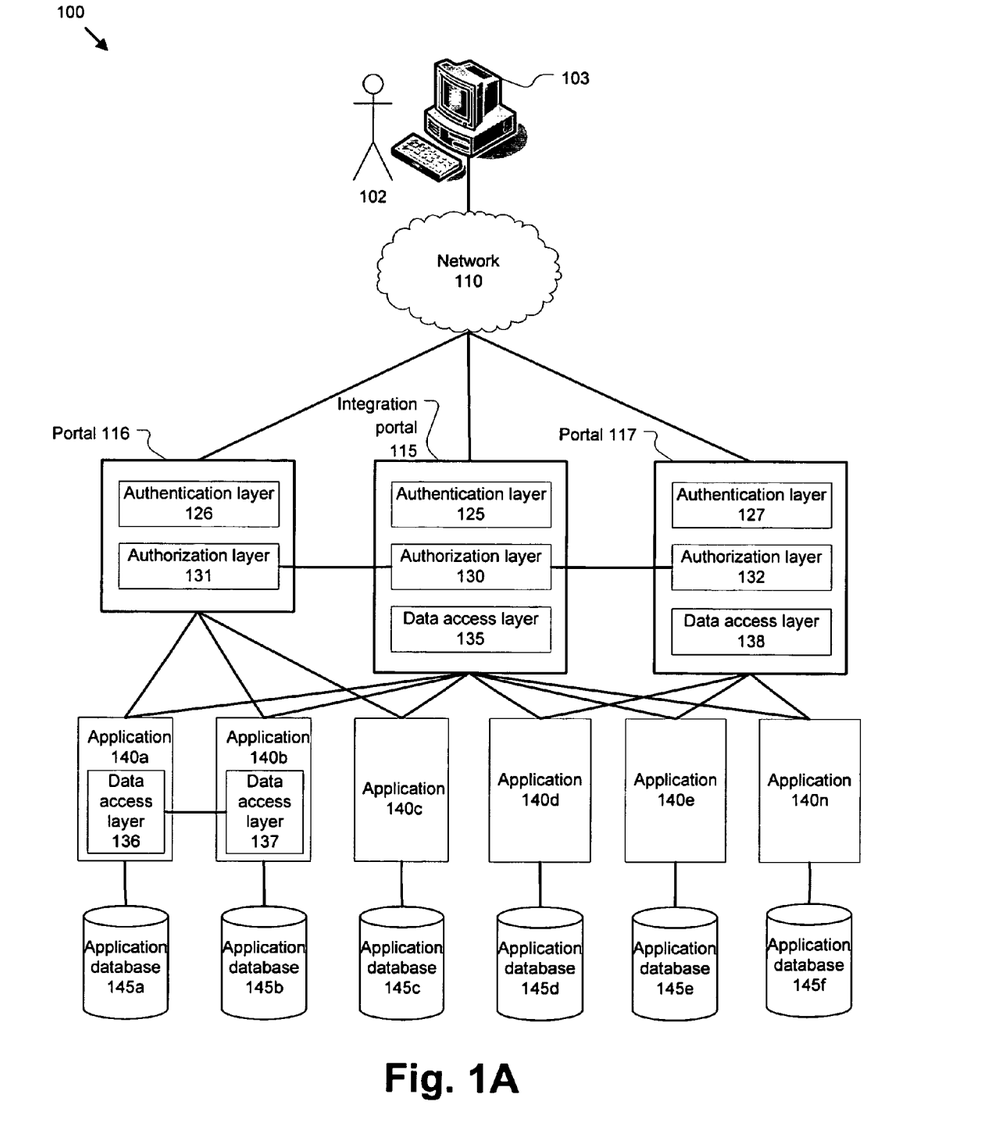
FIG. 1A illustrates an exemplary system for providing a user of a computing device with access to multiple applications within an enterprise through a portal.
Figure 1B:
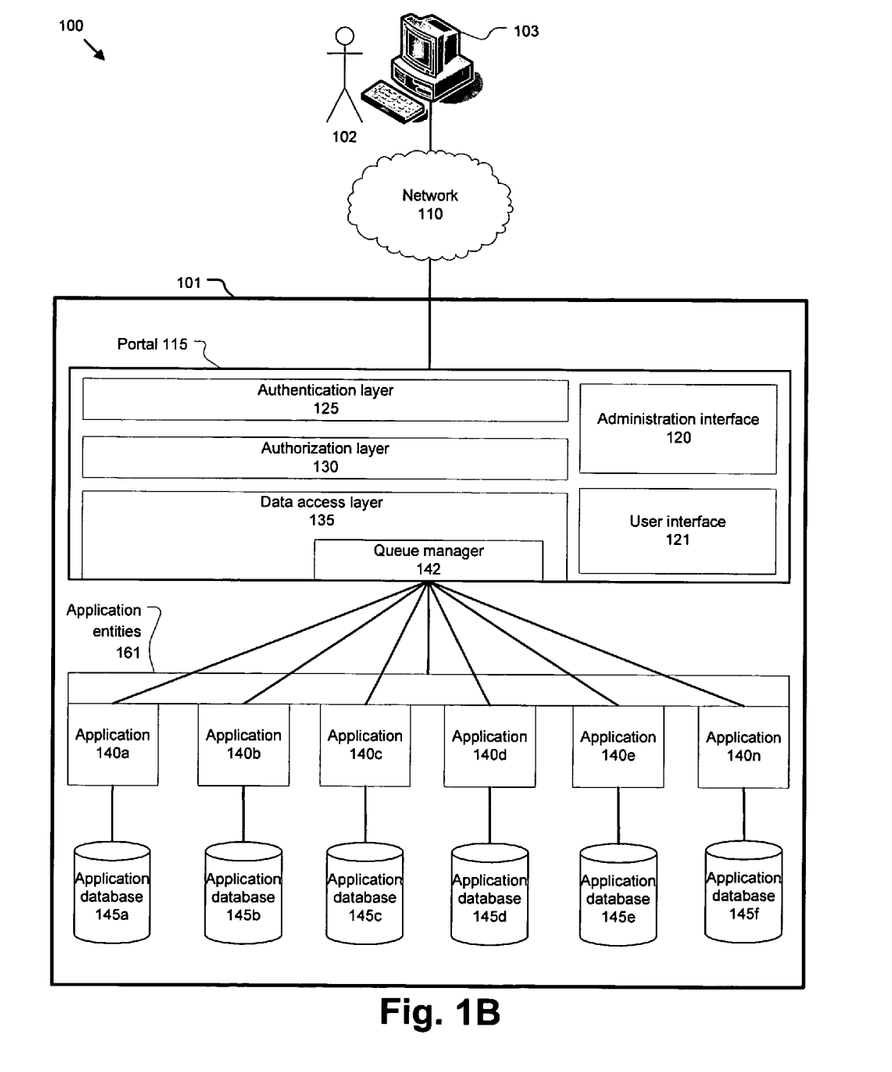
FIG. 1B further illustrates an exemplary system for providing a user of a computing device with access to multiple applications within an enterprise through a portal.

FIGS. 1A and 1B illustrate various aspects of an exemplary system 100 for providing user 102 of computing device 103 with access to multiple applications 140a to 140e and 140n through integration portal 115.

As seen in FIG. 1A, portals 116 and 117 provide access to one or more applications 140 that also are accessible through portal 115. In some cases, a portal 116 or 117 may be dedicated to a particular single application 140. In any case, each of the portals 116 and 117 are generally dedicated to a particular subset of applications 140. In general, the set of applications 140a, 140b, and 140c available through portal 116 and a set of applications 140d, 140e, and 140n available through portal 117 do not overlap. Portal 115, on the other hand, provides a single, integrated point of access for user 102 to all applications 140a to 140e and 140n.

Portals 116 and 117 are sometimes referred to as legacy portals because they generally, although not necessarily, pre-exist portal 115. Portal 115 may replace portals 116 and 117, although embodiments are possible and likely in which legacy portals 116 and 117 exist alongside portal 115, thereby providing user 102 with several ways in which to access an application 140. It should be understood that, although FIG. 1A shows two legacy portals 116 and 117, embodiments are possible in which integration portal 115 provides access to applications 140 that previously were, and perhaps currently are, accessed through three or more legacy portals such as exemplary portals 116 and 117. Further, in some embodiments some or all applications 140 may be accessed directly, e.g., by accessing a computing device on which application 140 is installed, through network 110, etc.

As seen in FIG. 1B, user 102 of computing device 103 may be provided with access to multiple applications 140 within enterprise 101 through portal 115. Enterprise 101 represents any enterprise, or any collection of enterprises, that includes multiple and disparate applications 140. In fact, enterprise 101 is depicted in FIG. 1B for purposes of illustration, and not limitation, and it should be understood that portal 115 may be used to provide access to a set of application entities 141 included in applications 140. Application entities 141 may be included in one or more applications 140, and include items such as menus, web pages, and the like that provide various features and functions of applications 140 to user 102. Alternatively, embodiments are possible that do not include stand-alone applications 140, but simply include a set of application entities 141, wherein various users 102 are authorized to access various subsets of application entities 141. In any event, application entities 141 may be accessed through network 110 or some other network connected to portal 115, regardless of whether applications 140 including an application entity 141 are included within enterprise 101.

Portal 115 and computer 103 are generally each connected to network 110, which may be any network capable of providing digital communications between portal 115 in computer 103, and is generally a packet switched network. For example, network 110 may be any combination of a local area network (LAN), a wide area network (WAN), or the Internet, etc. Accordingly, user 102 generally accesses portal 115 by using a Web browser or some other suitable client application that is installed on computer 103. As noted above, portals 116 and 117, and in some cases applications 140, may also be accessed through a network such as network 110.

Portal 115 generally includes peripheral devices such as a keyboard, a mouse or other pointing device, a display, etc. to facilitate administration of portal 115 through administration interface 120. Administration interface 120 is usually a graphical user interface (GUI) such as may be provided through a webpage accessible through a Web browser or the like. Portal 115 further provides user interface 121, also usually a GUI, whereby user 102 may access applications 140. User interface 121 may include screens or web pages for accessing or providing functionality related to a single application 140, or for more than one application 140. For example, functionality related to a billing application 140 and also to a provisioning application 140 may be combined together within a single screen or webpage of user interface 121. Accordingly, user 102 may advantageously simultaneously access the two applications 140 where ordinarily the user 102 might be required to log in to the two applications 140 separately with separate user names and passwords.

Interfaces 120 and 121 may be rendered according to various ways of programming web pages, such as Java Server Pages (JSPs). Further, using server technologies, e.g., Enterprise Java Beans (EJB) and the like, data such as queries, responses to requests for information, etc., may be processed, e.g., submitted applications 140, databases 145, and/or data stores 167 and 190, discussed further below with reference to FIGS. 3 and 4.

Portal 115 generally includes authentication layer 125, authorization layer 130, and/or data access layer 135, each discussed in more detail below, to provide for access to applications 140 by user 102. Similarly, portals 116 and 117 include authentication layers 126 and 127 respectively. In the embodiment illustrated in FIG. 1B, portals 116 and 117 further each include respectively authorization layers 131 and 132. However, it is possible for authorization layers 131 or 132 to be included in one or more applications 140. Further, in the illustrated embodiment, applications 140a and 140b, accessible through portal 116, include data access layers 136 and 137 respectively. Portal 117 includes data access layer 138, thereby negating any need for such to be included in applications 140d, 140e, and 140n accessible through portal 117.

Authentication layers 125, 126, and 127 generally include program instructions such as are known for authenticating user 102 to portals 115, 116, and 117, respectively, e.g., by requiring entry of a login identifier and a password for user 102, by checking a digital certificate, by verifying an Internet Protocol (IP) address for computer 103, etc.

Authorization layers 130, 131, and 132 are included in portals 115, 116, and 117 respectively, and generally include data and program instructions to provide for access by user 102 to specified features and/or functionality in one or more applications 140 that user 102 has been authorized to access.

Data access layers 135, 136, 137, and 138 generally include data and program instructions to provide for access by user 102 to one or more specific sets of data in applications 140. Data access layers 136 and 137 are included in applications 140a and 140b respectively, and accordingly include instructions only for accessing data in the relevant application database 145. Data access layer 135 is discussed further below with reference to FIG. 3. Certain applications 140 may allow all users 102 accessing the application 140 to access all data that may be provided by the application 140, and therefore do not include a data access layer, as is illustrated in FIG. 1A with respect to application 140c accessed via portal 116.

Queue manager 142, illustrated in FIG. 1B, supports sending and receiving messages between portal 115 and applications 140 by providing for asynchronous communications between portal 115 and applications 140. Also, as discussed further below, queue manager 142 provides for portal 115 to receive data updates from databases 145. In one embodiment, queue manager 142 includes IBM WebSphere MQ sold by International Business Machines Corp. of Armonk, N.Y.

Computer 103 may include any one of a number of computing devices, including, without limitation, a computer workstation, a desktop, notebook, laptop, or handheld computer, or some other computing device as is generally known, such as a Java-enabled cellular telephone or similar device. Computing devices such as the foregoing may employ any of a number of computer operating systems, including, but in no way limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computer 103 can include client applications such as web browser to permit access to portal 115, as well as a display, input devices, memory, storage, etc. as needed to provide for access to portal 115.

Portal 115, and also portals 116 and 117, generally include both hardware, including computing devices, and software for communicating with computer 103 and also applications 140. For example, in an embodiment, portal 115 includes one or more server computers provided with relational database and web server software, and also software that includes program instructions for providing administration interface 120, and also layers 125, 130, and 135. Such server computers may be provided with any of the computer operating systems mentioned above, or some other computer operating system. Portal 115 generally further includes storage devices such as disk arrays or the like attached to computing devices such as the afore-mentioned server computers. Also, it should be understood that portal 115 generally includes input devices, displays, network connections, and other peripherals necessary to support the functioning of portal 115.

Web server software enables a computing device within portal 115 to respond to requests from a web browser installed on computer 103, e.g., hypertext transfer protocol (HTTP) requests. Such Web server software, in conjunction with program instructions included in authentication layer 125, authorization layer 130, and/or data access layer 135, generally provides for communicating with applications 140, and for requesting and retrieving information from databases 145.

Applications 140 may communicate with portal 115 and databases 145 through a network such as a LAN (not shown), network 110, or some other network. Although not shown in FIG. 1, it will be understood that applications 140 generally run on one or more server computers provided with hardware peripherals and operating systems such as those mentioned herein. Applications 140 are generally each associated with a database 145, and in fact it is to be understood that applications 140 and databases 145 may be combined. Embodiments are also possible is which portal 115 accesses one or more databases 145 directly. For purposes of understanding illustrated embodiments, it is important to understand simply that applications 140 and databases 145 together generally support a particular business function or set of functionality. For example, an application 140 may be a billing system, a repair tracking system, an ordering system, etc.

Application entities 161 may be included in one or more applications 140, or may be accessible only through portals 115, 116, or 117, etc. For example, an application entity 161 may include an API call that affects data seen in both a billing system and an ordering system. To take another example, an application entity 161 may include a menu item, e.g., "View Customer Status," relevant to multiple back end systems.

With respect to relational databases included within portal 115 and/or databases 145, relational database software generally refers to a relational database management system (RDBMS), as is known. An RDBMS generally employs the known Structured Query Language (SQL) in addition to a language for creating, storing, editing, and executing stored procedures, such as the PL/SQL language mentioned above. However, it is to be understood that databases 145 may be some other kind of database such as a hierarchical database, a set of files, an application database in a proprietary format, etc. Each database 145 generally includes a computing device employing a computer operating system such as one of those mentioned above, and are accessed via a network in any one or more of a variety of manners, as is well known. Embodiments are possible in which at least some of databases 145 are both included in one RDBMS or are located within a single computing device.

Computer 103 and one or more computing devices included within portal 115 may each include instructions executable by one or more computing devices such as those listed above. Such instructions may be compiled or interpreted from computer programs created using a variety of programming languages and/or technologies, including, without limitation, and either alone or in combination, Java™, C, C++, Visual Basic, Java Script, Perl, etc. For example, one embodiment includes Enterprise Java Beans (EJBs) and stored procedures written in the PL/SQL language provided by Oracle Corporation of Redwood Shores, Calif. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

As mentioned above, portal 115 includes authentication layer 125, authorization layer 130, and/or data access layer 135. In embodiments discussed herein, portal 115 includes each of layers 125, 130, and 135, although embodiments are contemplated in which not all of layers 125, 130, and 135 are present. Some identification of users 102 by authentication layer 125 is generally necessary. However, it is to be understood that embodiments are possible in which authorization layer 130 is omitted, and in which access to applications 140 by user 102 is determined solely by the entitlements provided through data access layer 135. Similarly, data access layer 135 may be omitted from portal 115, in which case users 102 may be given access to all data and/or functionality included within applications 140 that each user 102 is authorized to access.

In embodiments disclosed herein, users 102 generally may access applications 140 through portal 115. Applications 140 are generally but not necessarily remote from portal 115, i.e., accessed through a network such as a LAN, WAN, etc. Users 102 are thereby provided access to diverse applications 140 through a single portal user interface 121 common to all applications 140 that may be accessed through portal 115. By providing such unified access to applications 140, portal 115 provides user 102 with a simpler and more efficient way to access applications 140 than would be available to user 102 if it were necessary to access applications 140 separately, or through different portals 116 and 117, and therefore to be authenticated, authorized, and entitled to diverse applications 140 separately. For example, because portal user interface 121 is common to multiple applications 140, user 102 need not remember multiple login names and passwords, nor need user 102 remember multiple ways of accessing multiple applications 140, e.g., multiple uniform resource locators (URLs) or web addresses.

Figure 2:
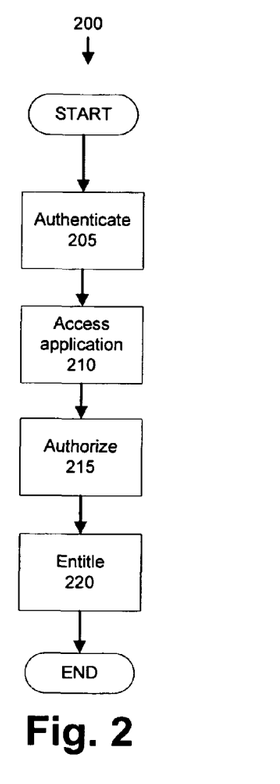
FIG. 2 illustrates an exemplary process for authenticating, authorizing, and entitling users of a portal.

FIG. 2 illustrates an exemplary process 200 for authenticating, authorizing, and entitling users 102 of the portal 115. It should be understood that user interactions with portal 115 as described with reference to process 200 occur through user interface 121.

Figure 3:
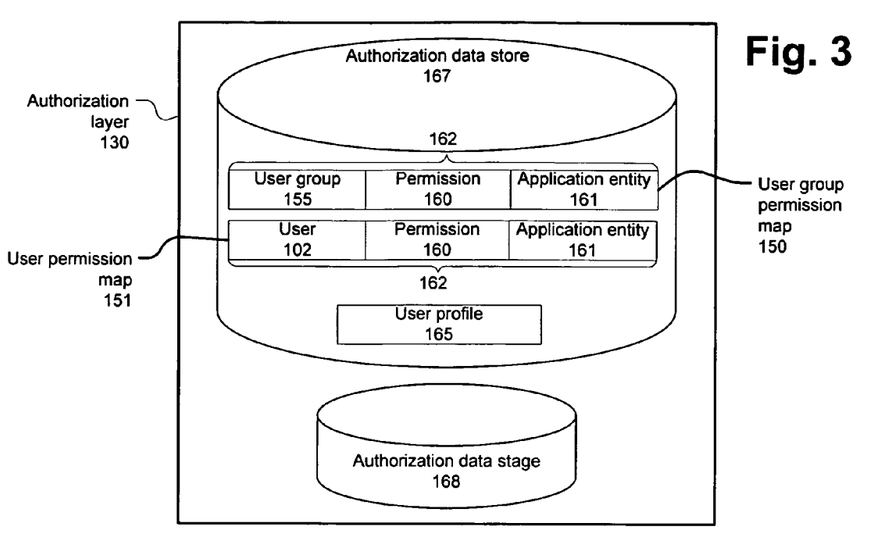
FIG. 3 provides a detailed view of an authorization layer, according to an embodiment.

The following sections discuss the steps of the process 200 in detail. However, a brief overview of process 200 may be helpful before providing the following detailed discussion. Briefly, process 200 begins with step 205, in which user 102 is authenticated to portal 115, e.g., by providing a user name and password to portal 115 through interface 121. Next, in step 210, user 102 is authorized to access items, e.g., features and/or functions, in one or more applications 140. Permissions 160, discussed in more detail below with reference to FIG. 3, are generally determined according to the username and password provided in step 205, and do not require further user interaction with portal 115 through user interface 121.

Next, in step 215, portal 115 determines user 102 data access entities 171, also discussed in more detail below. Next, in step 220, user 102 is provided access to authorized applications 140 through portal user interface 121. Process 200 ends after step 220.

Process 200 will now be discussed in further detail. First, in step 205, user 102 is authenticated by portal 115. Authentication layer 125, as mentioned above, is known for authenticating users 102 to portal 115. Authentication layers 126 and 127, in portals 116 and 117, respectively, generally operate in a similar fashion to authentication layer 125. For example, it is common to require users accessing applications over the World Wide Web of the Internet, and intranet, etc. to provide a login identifier and password before access is permitted. Generally a user 102 enters a login identifier and a password in a form provided through user interface 121. The entered login identifier and password are then checked against a database of users 102 permitted to access portal 115. Such database of users 102 may be protected by known security mechanisms, including storing login and password data concerning users 102 in encrypted form.

In one embodiment, the eTrust® SiteMinder software product sold by Computer Associates of Islandia, N.Y. is used to provide authentication of users 102 to portal 115. Further, mechanisms such as digital certificates may be used to authenticate users 102. Users 102 having digital certificates may provide portal 115 with a digital key that may be processed by portal 115, e.g. using a hashing technique or the like, to authenticate user 102. In general, authentication layer 125 or some similar mechanism is generally necessary to uniquely and definitively identified user 102 so that authorization and data access may take place as provided for by authorization layer 130 and data access layer 135 respectively.

Although not illustrated in FIG. 2, it should be understood that if portal 115 is unable to authenticate the user 102 and step 205, process 200 will terminate. However, assuming that user 102 is successfully authenticated and step 205, step 210 is executed next.

Continuing with process 200, in step 210, portal 115 provides user 102 with requested access to one or more applications 140, whereupon a user may request access to one or more application entities 161, meaning that authorization or authorizations 162 are determined as described hereinafter. However, unless user 102 is entitled to see all of the data presented by the requested applications 140, portal 115 next determines data access entities 171 of user 102 to access data included in applications 140 and/or databases 145, as described below.

FIG. 3 provides a detailed view of authorization layer 130, according to an embodiment. In step 215 of process 200, portal 115 determines items, i.e., application entities 161, in applications 140 that user 102 is authorized to access. Such determination is generally made by use of authorization layer 130. By determining such application entities 161, portal 115 is thereby able to present in user interface 121 functionality relating to one or more applications 140. In cases where an application entity 161 relates to more than one application 140, an authorization 162 for user 102 to access such application entity 161 may be determined transparently to user 102, and may be determined at one time for such application entity 161 that may be applicable to more than one application 140.

An authorization 162 includes an identifier for user 102, a permission 160, and an application entity 161. Permissions 160 represent various kinds of authorization to access application entities 161 that may be accorded to users 102. Application entities 161 are entities that may be identified in authorization data store 167 pertaining to applications 140, such as an application 140 itself or a menu or webpage that may be provided in one or more applications 140, or a method in an application program interface (API) that may be called or accessed by or on behalf of a user in an application 140. Accordingly, permissions 160 specify actions that user 102 is authorized to take with respect to application entity 161, e.g., authorizations to view, modify, delete, download, query, select, access, etc. application entity 161.

Figure 8:
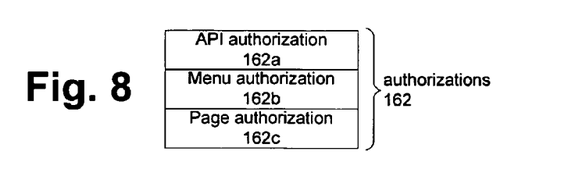
FIG. 8 illustrates examples of authorization entities.

FIG. 8 illustrates examples of authorizations 162, i.e., unique combinations of users 102, permissions 160, and application entities 161. API authorization 162a specifies that user 102 has permission to access a particular application program interface (API). API authorizations 162a are used when more than one application 140 uses an API. For example, as described below with reference to FIG. 9, various applications 140 may provide user 102 with the ability to make administrative changes to portal 115 through administration interface 120. Such administrative changes may include adding, modifying, or deleting authorizations 162 and/or data access entities 171. For example, more than one application 140 accessible through portal 115 may provide user 102 with access to billing data. Accordingly, more than one application 140 may access an API that allows user 102 to add, delete, or modify billing data. However, if user 102 does not have the appropriate API authorizations 162a to access an API used to transmit additions, deletions, and modifications to an administration database, then even if user 102 is able to access administration interface 120, user 102 will not have the ability to make administrative changes to portal 115, such as allowing user 102 access to an API that provides access to billing data.

Menu authorization 162b pertains to menus or menu items that may be presented to user 102 through portal user interface 121. For example, user 102 may be associated with an permission 160 to access a billing system, but may not be entitled to change any data in a billing system, but rather is simply entitled to view data in a billing system. Accordingly, authorization 162b may provide user 102 with access to menu items for viewing billing data, but user 102 will not be provided with authorization 162b for modifying billing data.

Page authorization 162c pertains to specific webpages or screens that may be presented to user 102 through portal user interface 121. Continuing the example provided in the previous paragraph, user 102 may be provided with an authorization 162c to access a webpage that displays billing data, but not to access a webpage that allows support modification of billing data. Similarly, user 102 may be provided with an authorization 160c to access a webpage that displays high level or summary level data, but not to access a webpage that provides granular or detailed reporting.

Permissions 160 and application entities 161 generally have a many-to-many relationship in authorization data store 167 with each other and with users 102. In other words, while authorization 162 generally includes one each of a permission 160 and an application entity 161, the permission 160 and application entity 161 may be included in other authorizations 162. Further, authorizations 162 may be, and generally are, associated with more than one user 102. Sometimes such associations are achieved through a user group 155. User groups 155 are simply groups of one or more users 102 that may be associated with authorizations 162, i.e., permissions 160 and application entities 161. Permissions 160 generally have a many-to-many relationship with users 102 and also with user groups 155.

Associations of users 102 and authorizations 162 are generally identified in user permission map 151, while relationships between user groups 155 and authorizations 162 are generally identified in user group permission map 150. Generally user group map permission 150 and user permission map 151 are tables in a relational database included within portal 115, such as authorization data store 167. Further, a user profile 165, including a unique user 102 identifier, is generally stored for each user 102 of portal 115. A user profile 165 may include various information concerning user 102, including one or more user groups 155 associated with user 102. Embodiments are possible in which authorizations 162 may be stored directly in user profile 165, e.g., a permission 160 and application entity 161 may be stored together in user profile 165, thereby signifying an authorization 162 associated with user 102.

By querying authorization data store 167 or the like, portal 115 may determine authorization or authorizations 162 associated with user 102, i.e., the application entity or entities 161 that a user 102 is authorized to access, and the manner in which the user is authorized to access such application entities 161. Such a determination may be used to govern the presentation of one or more applications 140 to user 102, e.g., as takes place in step 215.

Authorization data stage 168 is also included in authorization layer 130. As discussed further below with respect to FIG. 7, authorization data stage 168 is used for receiving information from applications 140 concerning authorizations 162, and for using this information to update maps 150 and 151 in authorization data store 167. Similarly, authorization data stage 168 is used for receiving information from authorization data store 167 concerning authorizations 162, and for using this information to update authorization information maintained by applications 140. In an embodiment, authorization data stage 168 is maintained according to Lightweight Directory Access Protocol (LDAP). As is known, LDAP may be used to store and provide information concerning users 102 of application 140.

Continuing with the description of process 200, if portal 115 determines that user 102 is not authorized, i.e., is not associated with any permissions 160 to access any applications 140, then process 200 will terminate following step 215, although such termination is not illustrated in FIG. 2. On the other hand, if user 102 is associated with one or more permissions 160, i.e., user 102 is authorized to access one or more applications 140, then generally process 200 proceeds to step 220 wherein user 102 is presented with requested application entities 161.

Further, as was noted above, embodiments are possible in which authorization layer 130 is omitted entirely. As will be apparent, step 215 will also be omitted in such embodiments. Accordingly, in these embodiments, process 200 will proceed directly from step 205 to step 215. In such embodiments, users 102 may be allowed to access all applications 140 that are available through portal 115, but may be restricted to accessing only data to which they are entitled as described below with respect to step 220. Moreover, in embodiments in which data access layer 135 is omitted, process 200 ends after step 215.

Figure 4:
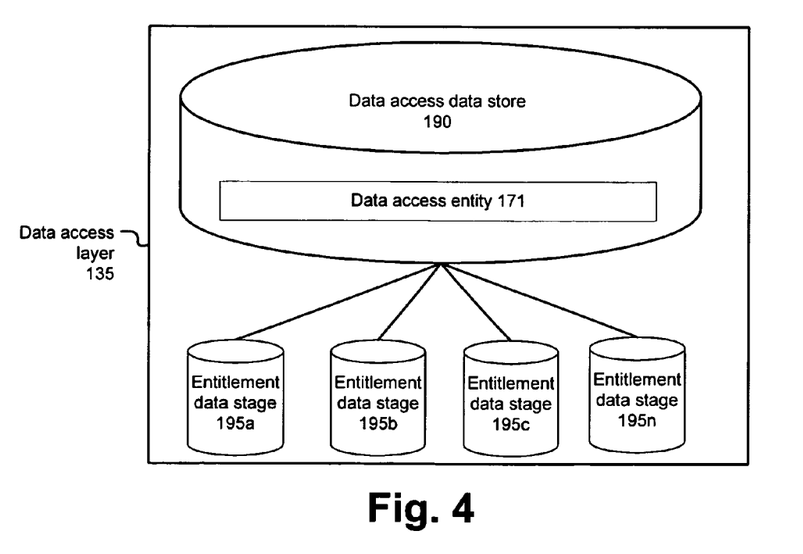
FIG. 4 illustrates an authentication layer, according to an embodiment.

In step 220, portal 115, using data access layer 135, determines data access entities 171 for user 102. FIG. 4 illustrates data access layer 135, according to an embodiment. Data access layer 135 is described in further detail in co-pending application Ser. No. 11/584,098 entitled "INTEGRATED DATA ACCESS," filed the same day as the present application, assigned to the assignee of the present application, and fully incorporated by reference herein in its entirety.

Data access entity represents an entitlement to access one or more data entities, i.e., a specified subset of data, in applications 140 and/or databases 145, e.g., a record or set of records in tables in databases 145. For example, data entities in a billing system may include a "subscriber" data entity, whereby each subscriber represents a customer or subscriber billed by the system. In this example, data access entity 171 may include a data entity identifying a subscriber, or, if the subscriber data entity exists in a hierarchy whereby subscribers are included in "subscriber groups," data entity may include an identifier for a subscriber group. Generally, a data entity identifies data that is of interest only to a particular user or set of users 102. Further, data identified by a data entity in a data access entity 171 is generally the only data that a user 102 associated with the data access entity 171 should be allowed to access in applications 140. That is, data access entity 171 effectively serves as mechanism to prevent users 102 from accessing data that they are not entitled to access in addition to providing users 102 with access to data that they are entitled to access. It is possible to include more than one data entity in a data access entity 171. For example, a first data entity in data access entity 171 may refer to a set of billing data, and a second data entity in data access entity 171 may refer to a set of repair data.

Returning again to process 200, in step 220, user 102 accessing applications 140 according to the authorizations determined in step 210 is provided with requested data according to data access entities 171.

Following step 220, process 200 ends.

Figure 5:
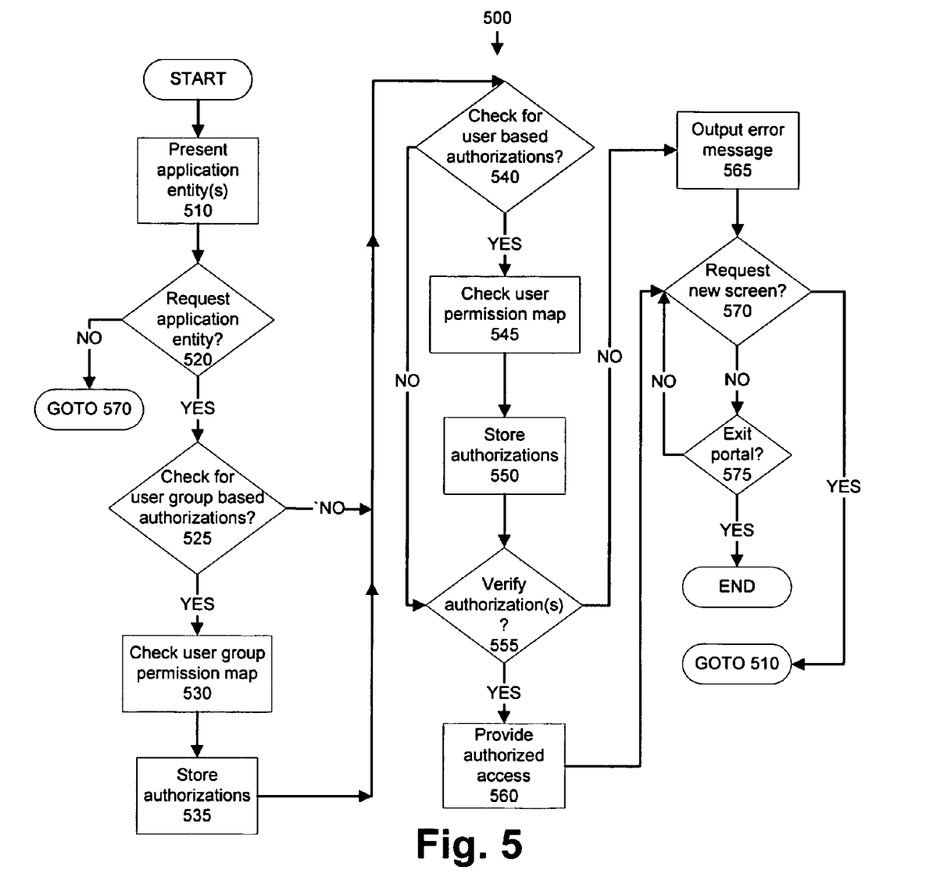
FIG. 5 illustrates an exemplary process for determining an authorization entity or entities associated with a user.

FIG. 5 illustrates an exemplary process 500 for determining an authorization entity or entities 171 associated with user 102, thereby determining items such as data and/or functionality that user 102 is entitled to access in application 140. As should be apparent, many of the steps of process 500 are carried out without being apparent to the user 102, before the user 102 accesses application 14 or portions thereof.

In step 510, user 102 is presented with one or more application entities 161 in user interface 121. Step 505 may generally occur only after a user 102 has been authenticated to portal 115 as described above. However, it should be understood that step 505 may occur at any time a user 102 navigates to a web page or screen in user interface 121 presenting one or more application entities 161. For example, user 102 may be presented with a screen or page in the user interface 121 that provides a list of applications, menus, web pages, screens, features provided by calling into an API, etc. that the user 102 may access in portal 115.

Next, in step 520, it is determined whether user 102 has requested to access an application entity 161. For example, user 102 might request a report, enter a query, request a particular web page, or request to see some other portion of user interface 121, such as a menu or set of menu items. If it is determined that user 102 has not requested to access an application entity 161, process 500 proceeds to step 570 in which it is determined whether user 102 has requested a new screen presenting a different set of application entities 161. However, if user 102 has requested to access one or more application entities 161 through application 140, step 525 is executed next.

In step 525, it is determined whether portal 115 is to check for authorizations 162 according to a user group 155. Step 525 is optional. In some embodiments, portal 115 may always check for authorizations 162 according to user group 155, while in other embodiments user groups 155 may not be included, and therefore such a check would not make sense. However, in some cases it may be possible for portal 115 to determine, e.g., according to a user identifier or other information in a user profile 165, whether authorizations 162 may be associated with a user group 155 to which the user 102 belongs. If it is determined that portal 115 should check for authorizations 162 according to a user group 155, step 530 is executed next. Otherwise, step 540 is executed next.

In step 530, portal 115 identifies user group or groups 155 to which user 102 belongs. Portal 115 may support both users 102 who do not belong to any user groups 155 as well as users 102 who do belong to one or more user groups 155. There are a number of different ways in which portal 115 may determine whether user 102 belongs to one or more user groups 155. For example, information concerning user groups 155 may be stored in user profile 165, or portal 115 may check user group map 150 to determine whether user 102 may be found.

Next, in step 535, portal 115 queries user group authorization map 175 to determine authorizations 162 for user group 155 including user 102, and stores authorizations 162 for user 102 in memory or some other medium, e.g., using a session variable or the like. In one embodiment, an Enterprise Java Bean (EJB) may be instantiated for storing, and providing portal 115 with access to, authorization 162. Accordingly, when portal 115 needs to determine whether user 102 is entitled to access particular data, it may call the EJB that includes authorization 162 by passing in an identifier for the item, e.g., data, menu items, API methods, etc., that user 102 wishes to access, to determine whether such access may be granted. Other kinds of programming instructions, such as stored procedures, may be used, perhaps in combination with an EJB, to determine authorizations 162.

In the embodiment illustrated by FIG. 5, step 540 is visited regardless of whether it has been determined in step 525 not to check for authorizations 162 for user 102 according to user group 155. However, embodiments are possible in which, after checking for authorizations 162 according to user group 155 including user 102, portal 115 then omits to check for authorizations 162 that are specifically associated with user 102 and not with user group 155. Further, in some embodiments, if it has been determined not to check for authorizations 162 according to user groups 155 in step 525, it is simply assumed that portal 115 should check for authorizations 162 according to the identity of user 102. Step 540 is executed following step 535.

In step 540, portal 115 determines whether to check for authorizations 162 pertaining to user 102 simply according to the identity of user 102. Such determination may be made according to information in a user profile 165, according to information encoded into an identifier for user 102, or according to other rules programmed into portal 115. In any event, if such a check for authorizations 162 is to be made, step 545 is executed next. If not, step 555 is executed next. It should be noted that portal 115 is preferably programmed so that at least either steps 530 and 535 or 545 and 550 are executed, i.e., so that authorizations 162 are checked according to at least one of user 102 and user group 155.

In step 545, portal 115 queries user authorization map 180 to determine authorizations 162 for user 102 in application 140. As noted above, authorizations 162 are generally keyed to a combination of user 102 and permission 160.

Next, in step 550, authorizations 162 relating to user 102 are then stored in memory or some other medium as described above with respect to step 525. Step 545 is executed following step 540.

Next, in step 555, authorization 162 is verified according to the request for an application entity 161 made by the user or on behalf of the user in step 520. Authorization 162 may be accessed, e.g., a call may be made to an EJB, to determine what data user 102 is entitled to access through application 140. If it is determined in step 555 that user 102 is entitled to the requested application entity 161, then step 560 is executed next. Otherwise, step 565 is executed next.

In step 560, the GUI for application 140, e.g., user interface 121, provides the feature associated with application entity 161 that was requested in step 520, e.g., by displaying a menu, menu items, web page, accessing an API, etc.

In step 565, which is executed if authorization 162 could not be verified in step 555, an error or message or the like may be displayed to user 102.

In step 570, a determination is made as to whether user 102 has requested a new screen or web page in user interface 121. If not, process 500 proceeds to step 575. Otherwise, process 500 returns to step 510.

In step 575, a determination is made as to whether user 102 has requested to exit portal 115, or whether an indication that user 102 has exited portal 115 has been received in another manner, e.g., by a session variable or the like timing out. If such a determination is made, then process 500 ends. Otherwise, process 500 returns to step 570.

Figure 6:
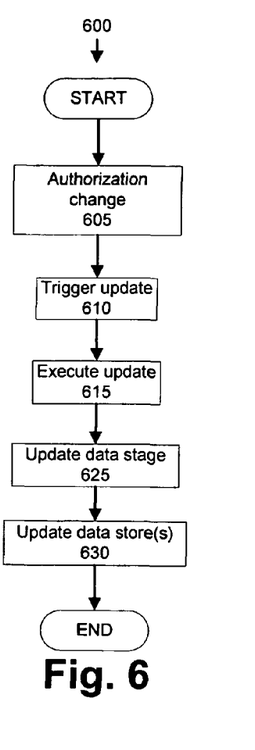
FIG. 6 illustrates a first exemplary process for updating an authorization data store.

FIG. 6 illustrates a first exemplary process 600 for updating authorization data store 167.

In step 605, authorization 162 is revised, added to, or deleted from database 145, authorization data store 167, or a data store in one of authorization layers 131 or 132, where authorization 162 pertains to an application entity 161. Such revisions or additions of authorization 162 may occur in a variety of ways. For example, an administrator of an application 140 may add user 102 to a list in database 145 of users 102 authorized to access application 140, and may further add to database 145 information concerning one or more authorizations 162 granted to user 102 with respect to application 140. It is also possible to provide an administrator of portal 115 with the ability to add user 102 as an authorized user in data store 167, and further with the ability to grant one or more authorizations 162 user 102 with respect to application entity 161. Similarly, administrators may be provided with the ability to delete users 102 from database 145, data store 167, data stores in authorization layers 131 or 132, etc., or to grant or revoke authorizations 162 to users 102. In any event, the requirements of step 605 are met when authorization 162 is added to, revised in, or deleted from database 145, authorization data store 167, or a data store in one of authorization layers 131 or 132.

Next, in step 610, an update mechanism in the data store modified in step 605 is triggered to update authorization data stage 168 in authorization layer 135 with the information changed in step 605. The update mechanism may be a set of program instructions included in application 140 and/or database 145, or in authorization layers 131, 132, or 135, whichever is associated with the data store updated in step 605. For example, in an embodiment, the update mechanism may be a web service that periodically, e.g., once every 24 hours, synchronizes an LDAP data store associated with application 140 and data stage 168 which, as noted above, may be an LDAP data store. Other kinds of update mechanisms may also be used. For example, it is possible for database 145 to store all information relating to changed authorizations 162 in a file, e.g., using a stored procedure, and to provide such file to a corresponding update data stage 168 using file transfer protocol (FTP). Similarly, various stored procedures in database 145, data store 167, or data stores in authorization layers 131 or 132 may be created and utilized to provide information relating to changed authorizations 162 to update data stage 168.

Next, in step 615, the update mechanism triggered in step 610 is executed. For example, as noted above, a stored procedure in database 145 in data store 167, or a data store in authorization layers 131 or 132 may send information concerning changed authorizations to data stage 168.

Next, in step 625, authorization 162 change information triggers an update mechanism in update data stage 168, e.g., a stored procedure, a web service synchronizing LDAP data stores, etc., to update a table or tables in update data stage 168 that include authorization 162 information relating to application 140 and user 102. In some embodiments, update data stage 168 includes only information concerning changed authorizations 162, and is purged of all data after updating data access data store 190 as described below. It is also possible for updates to data stage 168 to include all information concerning authorizations 162 relating to application 140, and for update data stage to therefore be essentially copied over to authorization data store 167.

Next, in step 630, an update mechanism in update data stage 168 is triggered to provide the authorization 162 change information received in step 625 to various data stores, e.g., all data stores other than the one updated in step 605. For instance, an authorization 162 change to a database 145 may be updated in authorization data store 167, and may be further propagated to data stores in authorization layers 131 and 132 in portals 116 and 117. An update to authorization data store 167 may include an update to user permission map 150 or user group permission map 151, and it will be understood that similar structures in a database 145 or in data stores in authorization layers 131 and 132 may be updated. Again, the update mechanism may be provided in a variety of ways, frequently according to a stored procedure executed in a database including data stage 168 or a web service. Further, the trigger for the update mechanism may be provided in a variety of ways, such as according to scheduling program that triggers the update mechanism on a periodic, e.g., once every 24 hours, basis, or the trigger may be event-based, e.g., based on updates being made to an LDAP data store associated with an application 140, etc.

Following step 630, process 600 ends.

Figure 7:
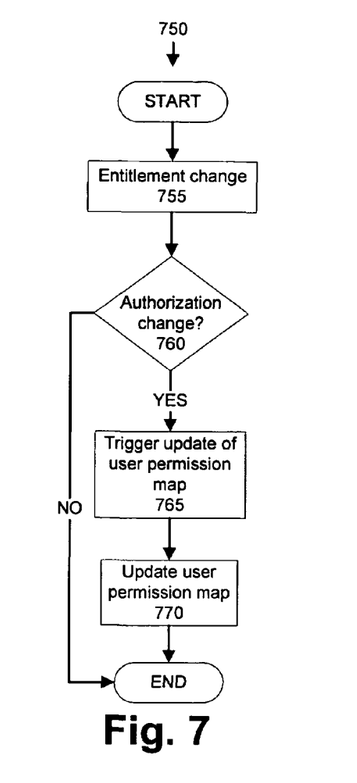
FIG. 7 illustrates a second exemplary process for updating an authorization data store.

FIG. 7 illustrates an exemplary process 750 for updating information concerning authorizations 162, e.g., in authorization data store 167.

In step 755, authorization layer 130 detects a change in one or more data access entities 171. For example, authorization layer 130 may employ a database stored procedure, a web service, or some other mechanism for checking for changes to data access entities 171 in data access data store 190 on a periodic basis, or according to an event such as the update of data access data store 190. Updates to data access entities 171 and data store 190 are described more fully in the above-referenced co-pending application Ser. No. 11/584,098, entitled "INTEGRATED DATA ACCESS."

Next, in step 760, authorization layer 130 determines whether the change detected in step 755 requires a change to authorizations 162, e.g., an update to user permissions map 151 and/or user permissions map 150 in data access data store 167. For example, if a user 102 is provided with a new entitlement to a data access entity 171, such an association may require the user 102 and a permission 160 to be associated with an application entity 161. In such a case, it may be that a user 102 the ability to modify a certain set of data records associated with data access entity 171, and an authorization 162, including the appropriate permission 160, should be established accordingly in authorization data store 167. For example, such modification of the set of data records may be accomplished by accessing an API method. Therefore, upon such modification to data access entities 171, it is desirable to provide the user 102 with the appropriate authorization 162 to access the API method that will allow the user 102 to modify data according to the data access entity 171.

If, in step 760, authorization layer 130 determines that the change detected in step 755 does require a change to authorizations 162, step 765 is executed next. If not, process 700 ends.

In step 765, authorization layer 130 triggers an update of user permission map 151 and/or user group permission map 150 to make the authorization 161 change required by the data access entity 171 change detected in step 755. Again, a database stored procedure, a web service, or some other mechanism may be used to trigger such a change in authorization data store 167.

Next, in step 770, authorization data store 167 is updated to reflect the change triggered in step 765.

Following step 770, process 700 ends.

Figure 9:
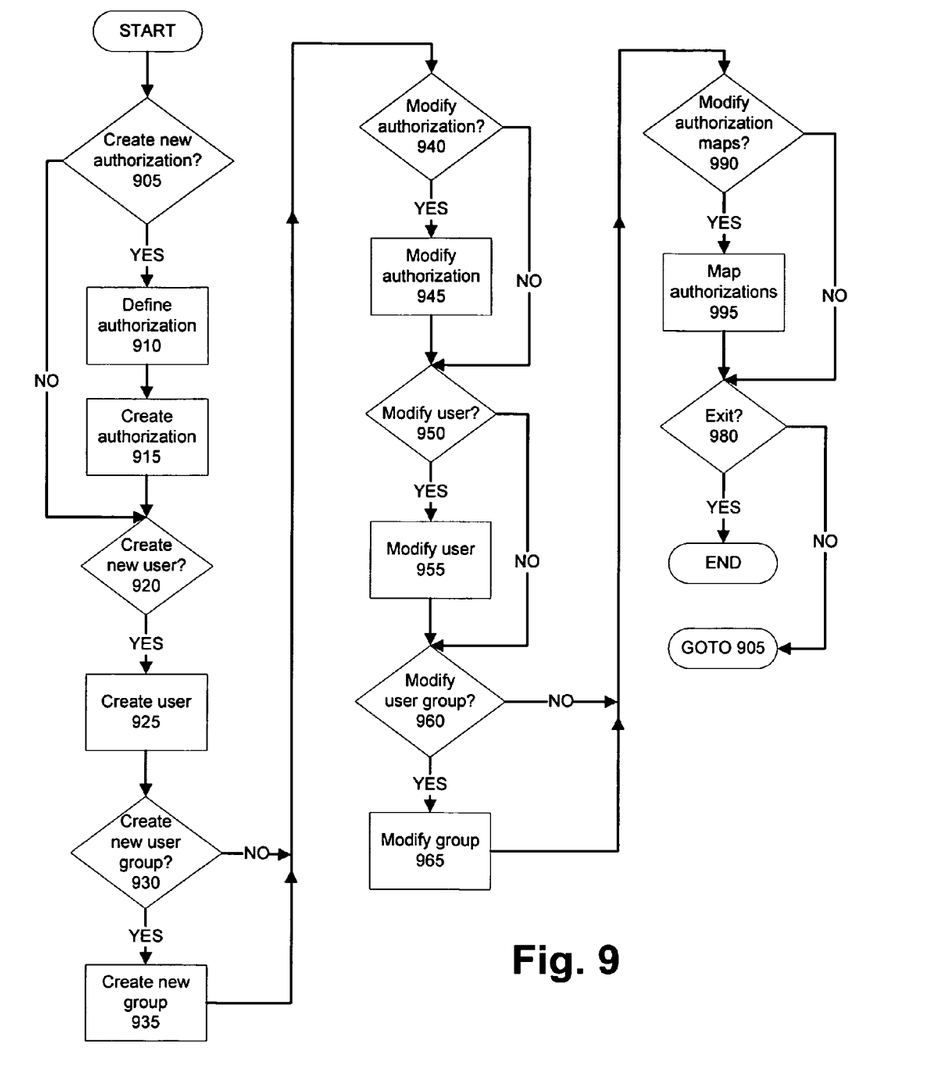
FIG. 9 illustrates an exemplary process for using an administration interface.

FIG. 9 illustrates an exemplary process 900 for using administration interface 120.

In step 905, portal 115 determines whether an administrative user 102 viewing administration interface 120 has entered a selection to create a new authorization 162. Such selection may be entered by choosing a menu option, or the like. Note that an administrative user 102 may access portal 115 using a computer included in or directly connected to portal 115 rather than through network 110, although access by an administrative user 102 through network 110 may also be possible. If user 102 has selected to create a new authorization 162, step 910 is executed next. Otherwise, step 920 is executed next.

In step 910, portal 115 defines the authorization 162 to be created. As noted above, in an embodiment, authorization 162 may pertain to a specified application entity 161, e.g., a menu, menu item, API call, etc.

Next, in step 915, portal 115 creates the defined authorization 162 by creating a record in user map 151 and/or user group map 150 including a user 102 or user group 155 as appropriate, a permission 160, and application entity 160.

In step 920, it is determined whether user 102 of administration interface 120 has selected to create a new user 102 for portal 115. If so, process 925 is executed next. Otherwise, step 930 is executed next.

In step 925, portal 115 accepts input through administration interface 120 providing information to create a new user 102, and saves the information in a user table or the like, and also saves information in other relevant stores, such as user group map 150, user map 151, user group data access map 175, and user data access map 180. Information concerning a new user 102 includes items to populate a user profile 165, such as a user name, a password, permissions 160, identifiers for user groups 155 to include the new user 102, data access entities 171 granted to the new user 102, etc. Once such information has been stored in the appropriate tables or the like, process 900 proceeds to step 930.

In step 930, it is determined whether input has been received from user 102 to create a new user group 155. If so, step 935 is executed next. Otherwise, step 940 is executed next.

In step 935, portal 115 accepts input through administration interface 120 providing information to create a new user group 155, and saves the information in a user group table or the like, and also saves information in other relevant stores, such as user group map 150. Input may also have been provided for associating the new user group 155 with permissions 160 and/or data access entities 171, in which case user group data access map 175 and/or user data access map 180 may also be updated. Following step 935, process 900 proceeds to step 940.

In step 940, it is determined whether input has been received from user 102 of administration interface 120 to modify an authorization 162. If so, step 945 is executed next. Otherwise, step 950 is executed next.

In step 945, authorization 162 is modified according to instructions received from user 102. It should be understood that modification of authorization 162 may include deletion of authorization 162 from portal 115, including removing data access entity 171 from user group map 150 and user map 151. Other modifications to authorization 162 may include substituting a different permission 160 and/or authorization entity 161 into authorization 162. Process 900 proceeds to step 950 following step 945.

In step 950, it is determined whether input has been received from user 102 of administration interface 120 to modify user 102, e.g., to modify information in user profile 165 such as that provided above as described with respect to step 925, to modify user map 151 associating user 102 with authorizations 162, etc. If such input has been received, process 900 proceeds to step 955. Otherwise, step 960 is executed next.

In step 955, user profile 165, user map 151, etc., are updated according to the input received in step 950. Further, it should be understood that information concerning user 102, such as information concerning authorizations 162 associated with user 102 in user permission map 151, may be updated in other ways, e.g., as described above with reference to FIGS. 6 and 7.

In step 960, it is determined whether input has been received from a user 102 of administration interface 120 to modify user group 155. If so, step 965 is executed next. Otherwise, step 970 is executed next.

In step 965, user group 155 is modified according to input received in step 960. Such modification may include deletion of user group 155. Further, user group 155 may be modified by associating additional permissions 160 with user group 155 and user group map 150, or by removing authorizations associated with user group 155 from user group map 150.

In step 970, portal 115 determines whether user 102 has selected an option in administration interface 120 to modify either user group data access map 175 or user data access map 180. If so, process 900 proceeds to step 975. However, if such input has not been received from user 102, step 980 is executed next.

In step 975, according to input received from user 102 of administration interface 120, user group permission map 150 and/or user permission map 151 are modified. For example, a user 102 could be newly associated with a pre-existing authorization 162 in user map 151. Similarly, user group 155 could be associated with a pre-existing authorization 162 in user group map 150. Further, such mappings could be deleted from map 150 and/or map 151.

In step 980, it is determined whether input has been received to exit administration interface 120. If so, process 900 ends. Otherwise, process 900 returns to step 905.

The processes, systems, methods, heuristics, etc. described herein have been disclosed in the context of system 100. However, the descriptions provided herein are intended to be illustrative and not restrictive, and it is to be understood that the processes, systems, methods, heuristics, etc. described herein could be equally applicable to testing other systems.

Further, with regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

We claim:

1. A system, comprising:
   at least one computing device;
   a first application portal implemented by the at least one computing device and providing a user access to a first set of one or more applications;
   a second application portal implemented by the at least one computing device and providing the user access to a second set of one or more applications;
   an integration portal implemented by the at least one computing device and providing the user access to application entities of a plurality of remote applications, wherein:
   the plurality of remote applications includes the first set of one or more applications and the second set of one or more applications, and
   at least one of the application entities is related to more than one of the remote applications; and
   an authorization layer that is included in the integration portal and that includes a permission map indicating an association between the user and at least one of the application entities of the plurality of remote applications that the user is permitted to access,
   wherein the authorization layer in the integration portal is synchronized with an authorization layer in the first application portal and an authorization layer in the second application portal, whereby the permission map is updated concerning information about at least one of the application entities that the user is permitted to access.

2. The system of claim 1, wherein the application entities include a method in an application programming interface (API).

3. The system of claim 1, further comprising a portal user interface included in the integration portal, wherein the portal user interface shows two or more of the application entities from two or more of the remote applications in a single screen of the portal user interface.

4. The system of claim 3, further comprising a remote computer connected to the integration portal by a network, whereby the user accesses the portal user interface.

5. The system of claim 1, wherein the authorization layer is synchronized with the remote applications, whereby the permission map is updated concerning information about at least one of the application entities that the user is permitted to access.

6. The system of claim 1, further comprising an administration interface for providing or updating information about at least one of the application entities that the user is permitted to access.

7. The system of claim 1, wherein the at least one of the application entities related to more than one of the remote applications comprises an application programming interface (API) call related to more than one of the remote applications.

8. The system of claim 1, wherein the at least one of the application entities related to more than one of the remote applications comprises a menu item relevant to more than one of the remote applications.

9. A method, comprising:
providing, by an integration portal implemented by at least one computing device, access to application entities of a plurality of remote applications, wherein the plurality of remote applications includes a first set of one or more applications accessible by a first application portal and a second set of one or more applications accessible by a second application portal;
accessing, by the integration portal, the application entities related to the plurality of remote applications on behalf of a user, wherein at least one of the application entities is related to more than one of the remote applications;
determining, by the integration portal, whether the user is associated with at least one of the application entities in a permission map included in an authorization layer in the integration portal, the permission map indicating an association between the user and the at least one of the application entities that the user is permitted to access; and
synchronizing, by the integration portal, the authorization layer in the integration portal with an authorization layer in the first application portal and an authorization layer in the second application portal, whereby the permission map is updated concerning information about at least one of the application entities that the user is permitted to access.

10. The method of claim 9, wherein the application entities include a method in an application programming interface (API).

11. The method of claim 9, further comprising providing, by the integration portal, a portal user interface to the user.

12. The method of claim 9, further comprising receiving, by the integration portal, updates from the remote applications concerning information about at least one of the application entities that the user is permitted to access.

13. The method of claim 9, further comprising receiving, by the integration portal, updates from at least one of the first application portal and the second application portal concerning information about at least one of the application entities that the user is permitted to access.

14. The method of claim 9, further comprising authorizing, by the integration portal, the user to access the at least one of the application entities based at least in part on the permission map.

15. The method of claim 9, further comprising using, by the integration portal, an administration interface for providing or updating information about at least one of the application entities that the user is permitted to access.

16. The method of claim 9, further comprising accessing, by the integration portal, the one or more remote applications via a network.

17. A system, comprising:
at least one computing device;
an integration portal implemented by the at least one computing device and providing a user access to application entities of a plurality of remote applications, wherein at least one of the application entities is related to more than one of the remote applications;
a portal user interface included in the integration portal, whereby at least one of the application entities is accessed through the portal user interface;
an authorization layer that is included in the integration portal and that includes a permission map indicating an association between the user and at least one of the application entities of the plurality of remote applications that the user is permitted to access, wherein the authorization layer is synchronized with the remote applications, whereby the permission map is updated concerning information about at least one of the application entities that the user is permitted to access;
a first application portal implemented by the at least one computing device and providing the user access to a first subset of the remote applications, including at least one of the application entities of the plurality of remote applications; and
a second application portal implemented by the at least one computing device and providing the user access to a second subset of the remote applications, including at least one of the application entities of the plurality of remote applications,
wherein the authorization layer in the integration portal is synchronized with an authorization layer in the first application portal and an authorization layer in the second application portal, whereby the permission map is updated concerning information about at least one of the application entities that the user is permitted to access.

18. The system of claim 17, further comprising a network that connects the integration portal, the first application portal, the second application portal, and the remote applications.

19. The system of claim 17, wherein the application entities include a method in an application programming interface (API).

20. The system of claim 17, further comprising an administration interface for providing or updating information about at least one of the application entities that the user is permitted to access.

21. The system of claim 17, further comprising a remote computer connected to the integration portal by a network, whereby the user accesses the portal user interface.

* * * * *